United States Patent [19]

Jennus et al.

[11] Patent Number: 4,869,942
[45] Date of Patent: Sep. 26, 1989

[54] TRILAMINATED ROOFING SHINGLE

[75] Inventors: Robert E. Jennus, Brandon, Fla.; Dale P. Major, Camden, Ark.

[73] Assignee: The Celotex Corporation, Tampa, Fla.

[21] Appl. No.: 135,967

[22] Filed: Dec. 21, 1987

Related U.S. Application Data

[62] Division of Ser. No. 895,988, Aug. 14, 1986, Pat. No. 4,729,814.

[51] Int. Cl.$^4$ ............................................. E04D 1/26
[52] U.S. Cl. ..................................... 428/77; 428/143; 428/192; 52/557; 52/559
[58] Field of Search ................. 428/77, 143, 172, 192, 428/141; 52/557, 558, 559

[56] References Cited

U.S. PATENT DOCUMENTS

| | | | |
|---|---|---|---|
| 1,698,891 | 1/1929 | Overbury | 52/557 |
| 1,829,886 | 11/1931 | Yates et al. | |
| 3,180,783 | 4/1965 | Walker et al. | 52/557 |
| 3,998,685 | 12/1976 | Czyzewski et al. | 156/260 |
| 4,198,257 | 4/1980 | Pfaff | 156/260 |
| 4,233,100 | 11/1980 | Cunningham et al. | 156/260 |
| 4,274,243 | 6/1981 | Corbin et al. | 52/748 |
| 4,717,614 | 1/1988 | Bondoc et al. | 52/557 |

Primary Examiner—Alexander S. Thomas
Attorney, Agent, or Firm—James W. Grace; Charles W. Vanecek

[57] ABSTRACT

This invention provides a process and apparatus which automatically and in a continuous and uninterrupted manner laminates a narrow strip of bituminous coated glass mat to the bottom side of a coated glass mat, cuts the laminated product to produce a laminate having cut-out areas between remaining tabs and then adheres thin strips of coated glass mat across the tabs to underlie the tabs and the cut-out areas. The final shingle is made from a single glass mat which is processed into a three level shingle, each level being made of a portion of the original glass mat.

3 Claims, 7 Drawing Sheets

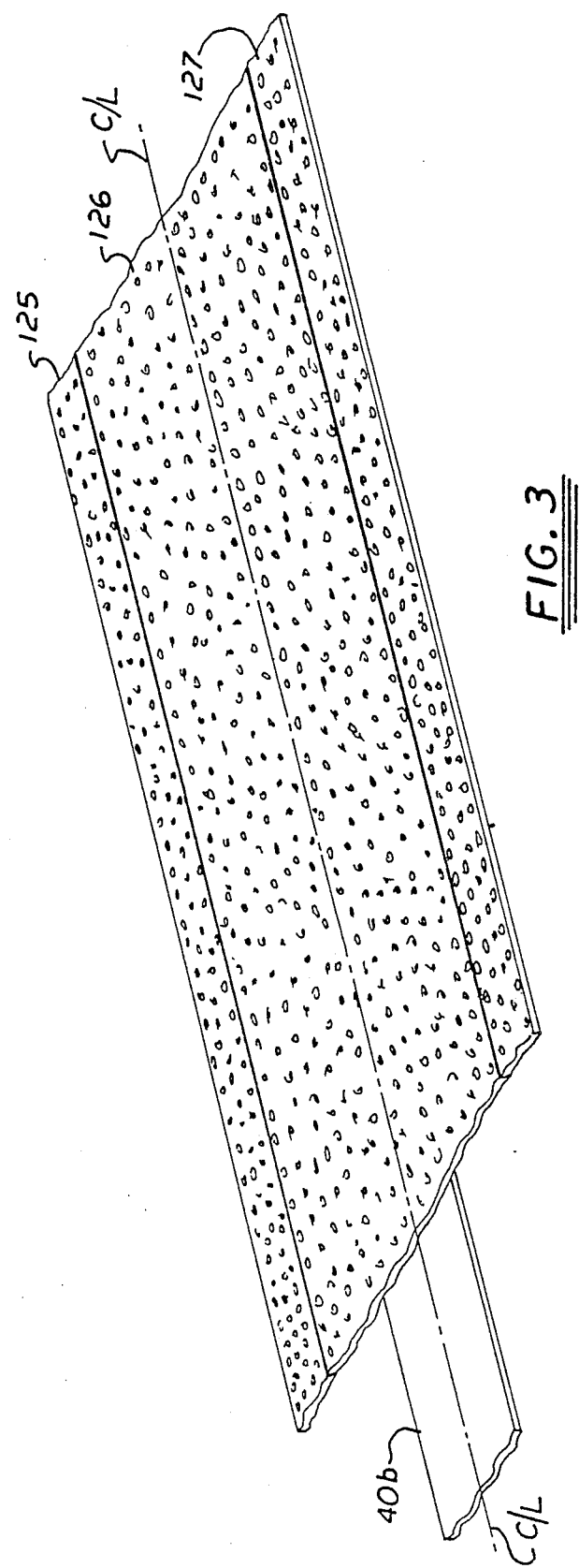

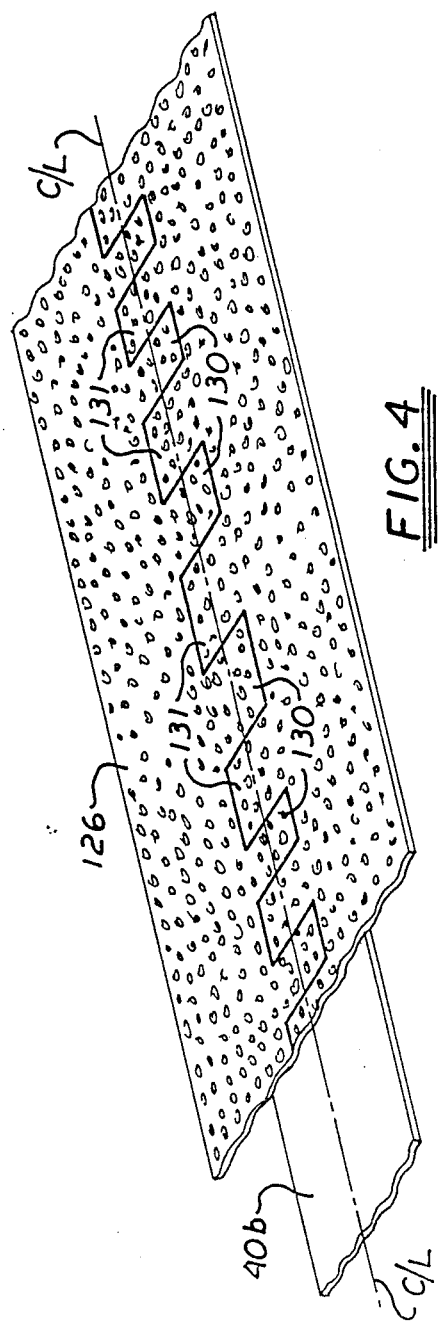
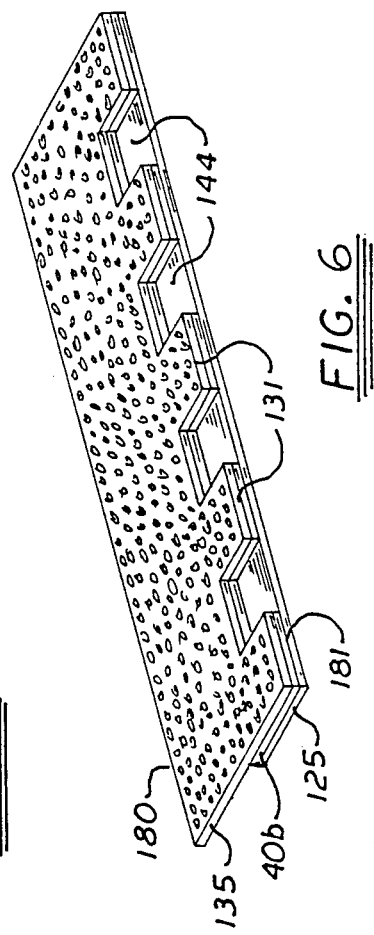
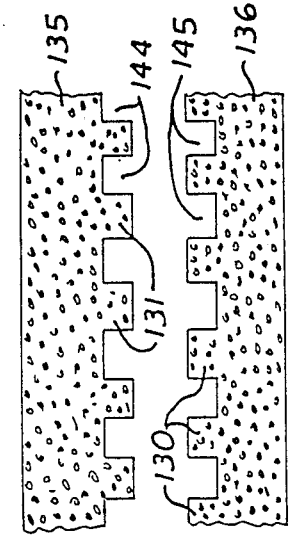
FIG. 4
FIG. 6
FIG. 5

TRILAMINATED ROOFING SHINGLE

This is a division of application Ser. No. 895,988, filed Aug. 14, 1986 now U.S. Pat. No. 4,729,814.

BACKGROUND OF THE INVENTION

1. Field of the Invention

This invention pertains to the field of roofing shingles.

2. Description of the Prior Art

Roofing shingles have been made in a continuous process in which the apparatus unrolled a felted sheet and immersed the sheet into a bath of bituminous material to saturate the sheet. The saturated sheet then was coated with a bituminous coating adhesive spread over its top and bottom surfaces. Slate roofing granules were applied to its top surface and a fine powder or sand was applied to the bottom surface. The shingle was then cut into a conventional size of 12 inches by 36 inches for packaging.

A more recent development which is thought to enhance the appearance of the finished shingle roof comprises a two-layer shingle in which a narrow strip of asphalt saturated felt is adhered along the exposed edge of the shingle to give the roof an improved appearance by presenting to the viewer's eye a thicker edge for the shingle. However, the laminating was accomplished by cutting shingles of two different widths at different times on the roofing machine and then in a hand operation laminating the narrower strip to the underside of the wider or conventional size shingle. The extra operation has proved to be cumbersome and the additional conveying and handling apparatus costly and space consuming. The extra laminating operation also presented problems in exactly aligning the two exposed edges of the laminates and achieving good adhesion.

Current technology comprises a roofing shingle which has a broad central area and a narrow strip adhered thereto along one edge of the central area. This roofing shingle has cut-out areas along the edge of the central strip and in the adhered narrow strip. The process for making this improved shingle is described and claimed in U.S. Pat. No. 3,998,685, entitled: APPARATUS AND PROCESS FOR MAKING AN OFFSET LAMINATED ROOFING SHINGLE AND ROOFING SHINGLE MADE THEREBY and assigned to The Celotex Corporation.

Recently, the organic felted material of which the roofing shingle used to be made has been changed to a glass fiber mat which is fire retardant. It is no longer necessary to saturate the glass mat in a bath of asphalt or bitumen. The glass mat is merely coated with an asphalt layer which also easily penetrates into the mat itself.

A newer development is a shingle which has a broad central area and a narrow strip adhered along one edge of the central area. The combination shingle has tabs between cut out areas along the edge which has the double layer of a wide central area and narrow strip as described in the cited patent. A third layer which is a narrow strip of the same material is adhered to the tabs to form a layer underlying and bridging the gaps which separate the tabs.

SUMMARY OF THE INVENTION

This invention provides a process and apparatus which automatically and in a continuous and uninterrupted manner laminates a narrow strip of bituminous coated glass mat to the bottom side of a coated glass mat, cuts the laminated product to produce a laminate having cut-out areas between remaining tabs and then adheres thin strips of coated glass mat across the tabs to underlie the tabs and the cut-out areas. The final shingle is made from a single glass mat which is processed into a three level shingle, each level being made of a portion of the original glass mat. This three-level roofing shingle made by the process is believed to be more aesthetically attractive than previous roofing shingles.

It is an object of the present invention to provide a novel apparatus for making a laminated roofing shingle in a continuous operation.

It is a further object of the invention to provide a novel apparatus which produces a laminated roofing shingle with a minimum of hand labor.

It is still another object of the present invention to provide a novel roof shingle.

It is yet another object of the invention to provide a novel process for making a novel laminated roofing shingle in a continuous manner.

Other features and objects of the present invention will become apparent to those skilled in the art when the present description is considered in the light of the accompanying drawings in which like numerals indicate like elements and in which:

FIG. 1 is a flow diagram useful in explaining the novel process of manufacturing the novel roofing shingle of the invention:

FIGS. 2, 2a, 2b, and 2c are simplified elevational views of the novel apparatus of the invention;

FIG. 3 is a perspective view of the top and bottom sheets laminated together after passing through a slitter;

FIG. 4 is a perspective view of the top and bottom sheets laminated together after passing through a cutter press.

FIG. 5 is a top view of one of the separated sheets after cutting and passing through a separator; and FIG. 6 is a perspective view of the novel roofing shingle of the invention after the third narrow strip is adhered to and below the tabs of the sheet of FIG. 5.

Figure 1:
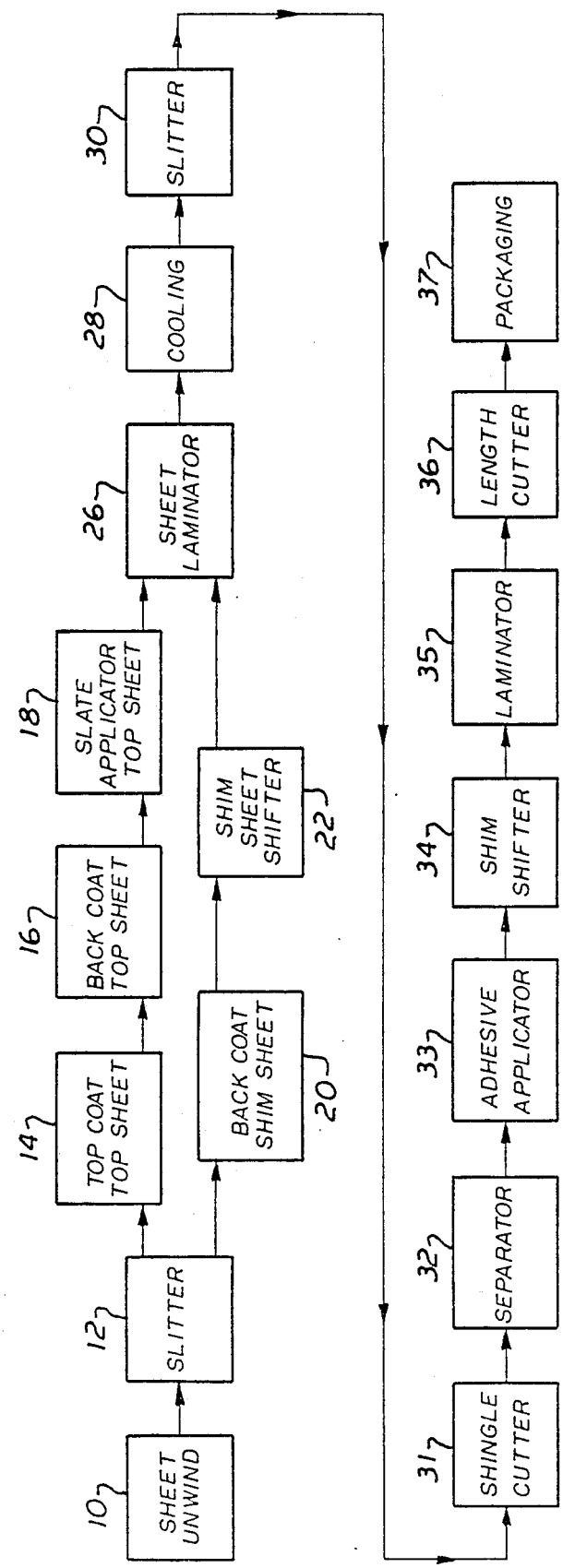

Referring now to the drawings and more specifically to FIG. 1 thereof, there is shown a flow diagram of the novel process of laminating and cutting the laminated sheet to produce a novel roofing shingle. It will be recognized that many of the basic steps of manufacture of the shingle are conventional and are carried out by well-known standard apparatus to be found in any roofing plant. The invention resides in the novel process, the arrangement of the elements of the apparatus and in the final product, the roofing shingle per se.

Hence, in order to avoid undue complexity and to describe the invention in as concise and complete a fashion as possible, the individual pieces of apparatus such as conventional electric motors, bearings, shafts, rolls, conveyors, frames, nuts, bolts, etc., have not been described.

The process may be described by observing the flow sheet of FIG. 1 and following the arrow which represents the sheet in its initial condition as a glass fiber mat in the form of a roll an as it continues to the finished shingle.

The initial sheet is most generally a mat of suitable glass fibers of approximately 16 pounds per 1,000 square feet. For purposes of this invention, the sheet will preferably be 41¼ inches in width, or multiples thereof, although other widths can be chosen without departing from the scope of the invention. The sheet, as supplied by the manufacturer, is wound on a mandrel or core which is suspended on a bracket to permit unwinding of the sheet. The sheet unwind station is indicated by the numeral 10.

The sheet is then fed to a slitter 12 which can be a conventional bevelled cutting wheel with an anvil roll on the opposite of the sheet. For purposes of the invention, the original 41½ inch sheet is cut to form two sheets; one 34 inches wide and the other 7½ inches wide.

The wider of the two sheets is fed to a top coat station 14 where an asphalt top coat is applied to the sheet. At the next station 16, the underside of the wider sheet passes over a back coater which applies a coat of hot asphalt to it.

Standard granules are dropped on the upper asphalt coating of the upper sheet at the slate applicator station 18. It should be understood that the formation of an asphalt coated sheet with top and bottom coatings and a layer of granules embedded in the top coat is accomplished in a conventional way well-known to those skilled in the art using well-known machinery.

The narrower sheet is concurrently moving through a back coating step 20 where the underside of the narrower (7½ inches) sheet is coated with an asphalt coating. Following this coating, the narrower strip is shifted over at station 22 so that the centerline of the narrower strip is coincident with the centerline of the wider strip and the narrower strip is under the wider strip.

It will be recalled that the underside of the wider sheet has an asphalt coating thereon. At station 26, the two sheets are brought into contact with the centerline of the narrower sheet being coincident with the centerline of the wider sheet and the narrower sheet being under the wider sheet. The wider sheet has a coating of granules on its upper surface.

The now laminated sheet continues through a cooling zone 28, and a slitter 30. The slitter is arranged so that it cuts one strip from each of the outer portions of the newly laminated sheet. The strips are of 6¼ inches wide. This leaves a central portion 21½ inches wide with a center laminate 7½ inches along the central axis of the laminated sheet.

Following this slitting step, a cutting apparatus 31 cuts the laminated sheet into two separate sheets with the double layer along its center line. The cut, laminated sheet is separated into two separate sheets by a separator 32. Each of the sheets has tabs separated by cut-out portions and the leading exposed edge of each sheet has a double thickness; one thickness being the central wider sheet and the other thickness being the narrower sheet, underlying the wider sheet.

An adhesive applicator 33 applies an adhesive to the exposed underside of the tabs on each of the separated sheets.

A shim shifter 34 aligns the narrow strips which were cut off the central sheet at slitter 30 with the edges of the tabs on the separated laminated sheet from separator 32.

A laminator 35 applies the narrow strip from the shim shifter 34 to the underside of the tabs on the central laminated sheet so that the strips are adhered to the underside of the tabs to form a three-tiered sheet. The narrow strips cover the cut-out portions between the tabs.

A length cutter 36 cuts the three-tiered sheet into suitable lengths for shingles and a packaging unit 37 accumulates the sheets to form a package which then is wrapped to form a bundle of shingles.

Suitable standard packaging apparatus 37 may be used to collect, package and wrap the finished roofing shingle for storage.

Having described the process with the flow diagram, reference may now be made to FIGS. 2, 2a, 2b, and 2c for a more detailed description of the apparatus. For purposes of simplifying the description, the apparatus for handling, unwinding the sheet and coating the sheet, will not be described since these are conventional and well-known pieces of equipment. Also the parts of the apparatus shown in block diagram form in FIG. 1 will be designated generally by the same numerals in FIGS. 2, 2a, 2b, and 2c.

Figure 2:
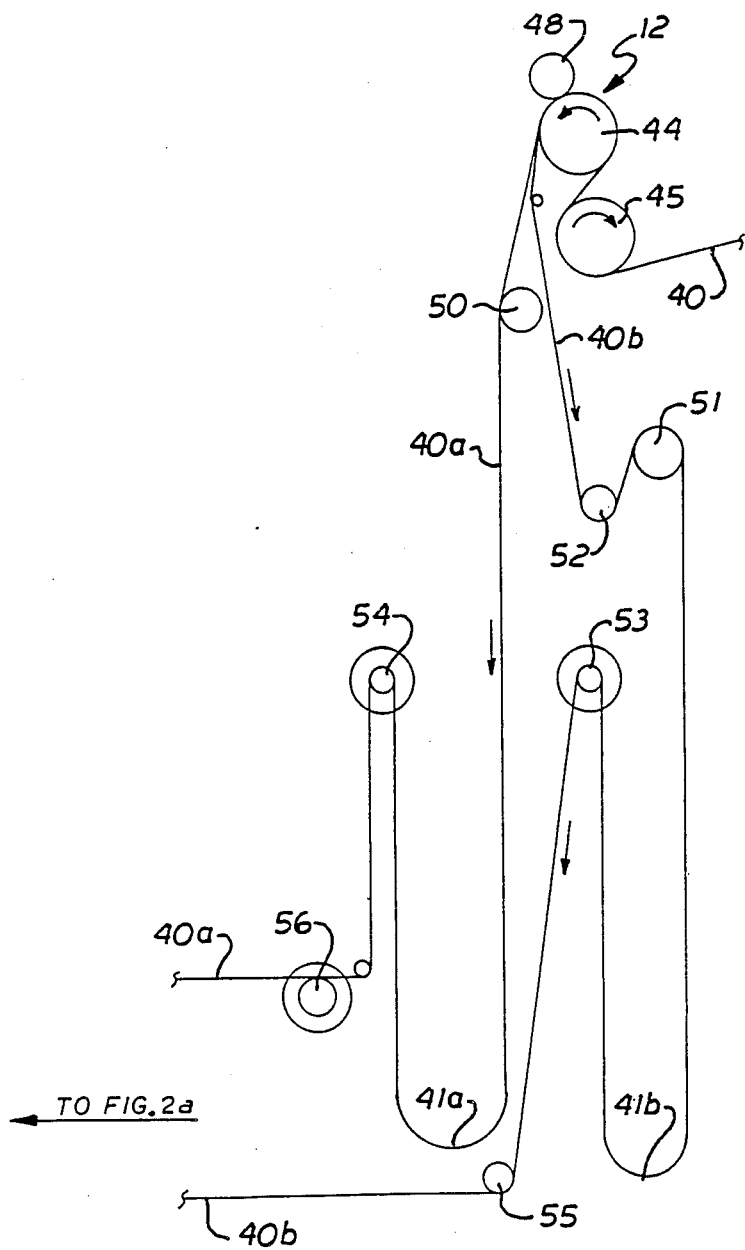

Starting at the right-hand edge of FIG. 2, glass mat 40 is pulled by roll 44 and 45 from the sheet unwind unit 10 (not shown on this drawing). A slitter 48, which may be a bevelled blade driven on a shaft by a suitable motor (not shown), cuts glass fiber sheet 40 into two portions, a wide sheet 40a and a narrow sheet 40b. As previously discussed, sheet 40 was preferably 41½ inches wide while sheet 40a is 34 inches wide and sheet 40b is 7½ inches wide. Obviously these dimensions are not critical but have been selected for the purpose of designing an attractive, finished product.

Sheets 40a and 40b form loops 41a and 41b respectively by means of pull rollers and guide rollers 50–56. Pull rollers and guide rollers 50–56 are conventional means for pulling and guiding sheets of coated glass mat through a roofing machine.

Figure 2A:
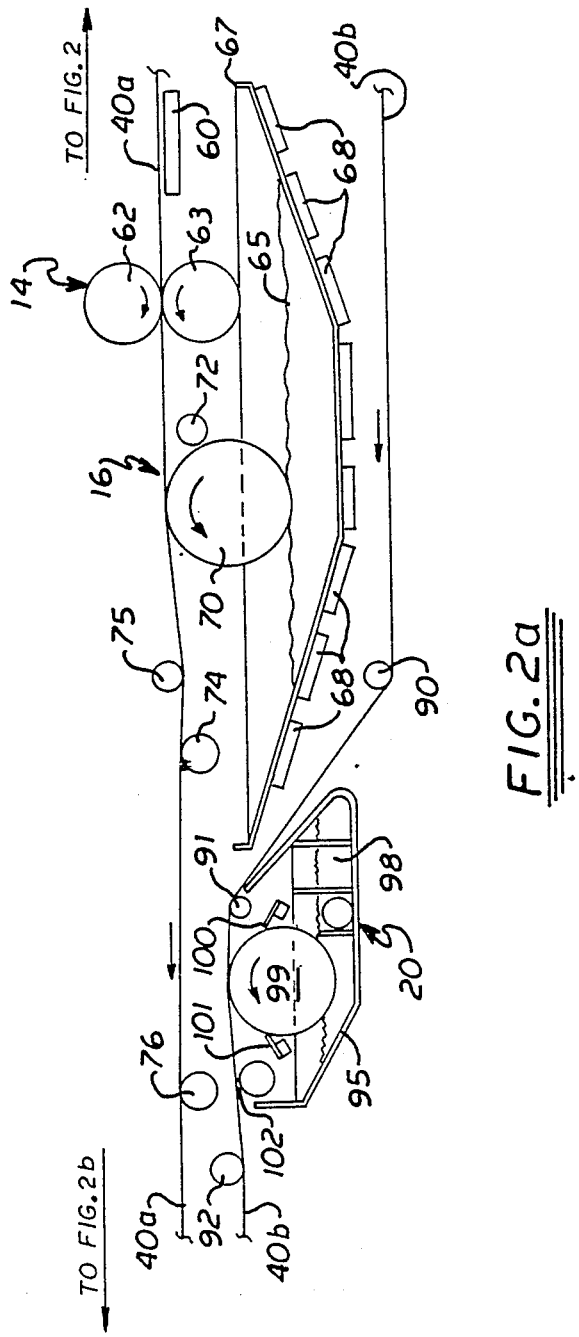

Referring now to FIG. 2a, sheet 40a is conveyed across the upper surface of a table 60 and between rolls 62 and 63. Roll 62 applies a coat of hot asphalt over the upper surface of sheet 40a from a pool of hot asphalt 65 maintained in a tank 67. Heaters 68 keep the coating asphalt at the proper temperature for application. Back up roll 63 keeps sheet 40a in contact with application roll 62 during the coating operation. Sheet 40a proceeds past back coating roller 70 which, with a doctor roll 72 to control thickness, applies a coating of hot liquid asphalt 65 to the back or under surface of sheet 40a. A doctor blade 74 removes excess coating from the back or under surface of sheet 40a. Guide and driving rolls 75 and 76 pull sheet 40a along.

Figure 2B:
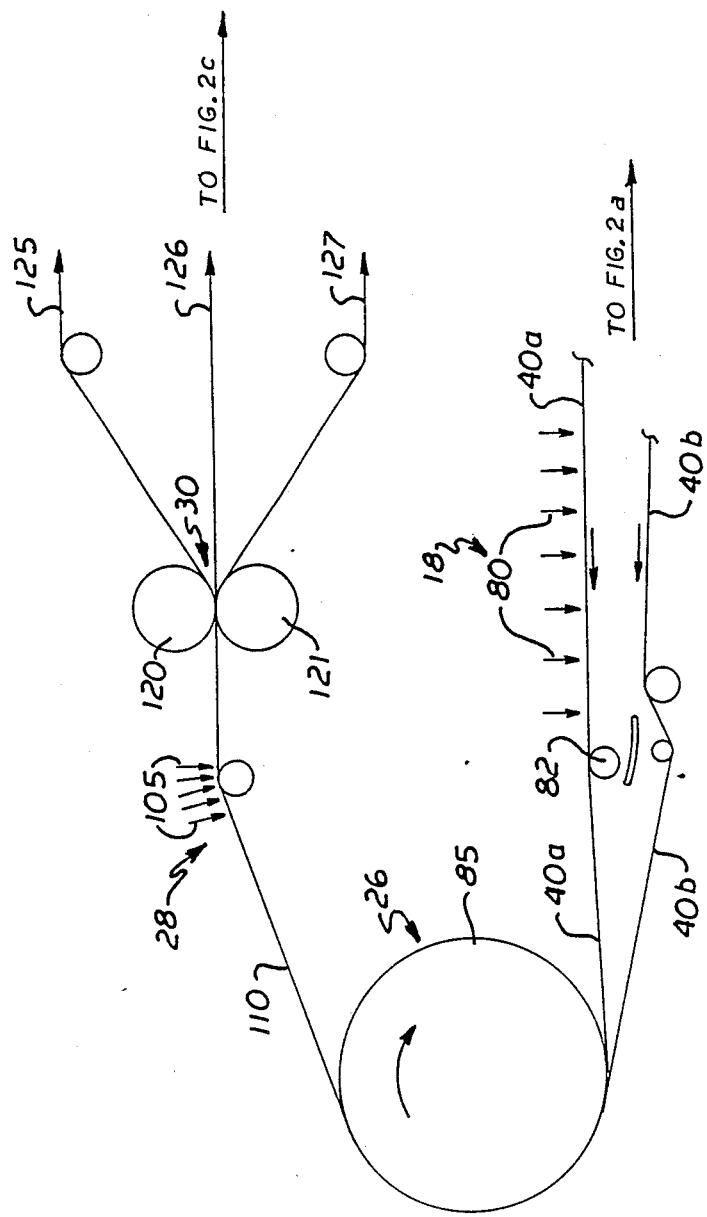

Referring now to FIG. 2b, roofing granules are dropped on the upper surface of sheet 40a at granule or slate applicator 18 where they become embedded in the top asphalt coat. The application of the granules is indicated by the arrows 80. The granules are fed from a granule hopper (not shown) and applied in a conventional manner. Sheet 40a continues over guide roll 82 to the outer surface of a laminating roll 85 at station 26. Laminating roll 85 also serves to press the granules firmly into the top coating of asphalt on the upper surface of sheet 40a.

Reverting now to sheet 40b and to FIG. 2a, sheet 40b is moved below tank 67 and across guide rolls 90, 91 and 92.

At station 20 a tank 95 holds hot liquid asphalt 98 and a roll coater 99 is partially immersed in asphalt 98 and contacts the under surface of shim sheet 40b to apply an undercoating thereto. Suitable doctor blades 100, 101 and 102 adjust the thickness of the coating on shim sheet 40b.

Sheet 40b proceeds to station 22 where it is shifted over so that its centerline is coincident with the centerline of sheet 40a. It is not necessary that the location of the shifting apparatus for repositioning shim sheet 40b be located after the coating operation, but it is sufficient that this shift take place between cutter 48 and laminating roll 85.

It will be recalled that sheet 40a runs over the outer periphery of laminating roll 85 at station 26. As can be seen now, sheet 40b, which is 7½ inches wide, lies against the underside of sheet 40a, which is 34 inches wide. The centerlines of the sheets are coincident. The asphalt coating applied to the under surface of sheet 40a serves as an adhesive to form a laminated sheet 110.

Sheet 110 passes through a cooling section 28 which may be cooling drums or simply a water spray system 105 which lowers the temperature of the laminated sheet 110 to set the adhesive action of the coating between sheet 40a and shim sheet 40b.

Laminated sheet 110 enters slitter 30 which comprises a pair of upper cutter blades 120 and lower backer rolls 121 (only one set of each pair is shown). Each set of the pair of cutter blades 120 and backer rolls 121 is spaced from the other set by a distance of 21½ inches. Thus, when sheet 110 passes through slitter 30, there are three strips emerging from the slitter. The center strip which comprises the laminated central are 126 is 21½ inches in width while the two outer strips 125 and 127 are each 6¼ inches in width.

Reference may be had to FIG. 3 which shows the sheet as it emerges from slitter 30.

The central laminated sheet 126 continues on to a cutter 31 comprising an upper cutter drum 128 and a back-up drum 129 which cuts sheet 126 into two separable strips 135 and 136. The outer surface of drum 128 has a preset pattern so that the two strips emerging therefrom have repeated interdigitating tabs 130 and 131 as shown in FIG. 4. As can be seen in FIG. 4, there are two separable elongated strips with an underlying narrower strip adhered to a wider overlying strip.

After laminated strip 126 is cut into two strips 135 and 136, they are separated at station 32. Station 32 may be two drums 138 and 139 which are positioned to rotate at an angle with respect to each other so that the two strips 135 and 136 will go on separate paths along conveyor belts (not shown).

Figure 2C:
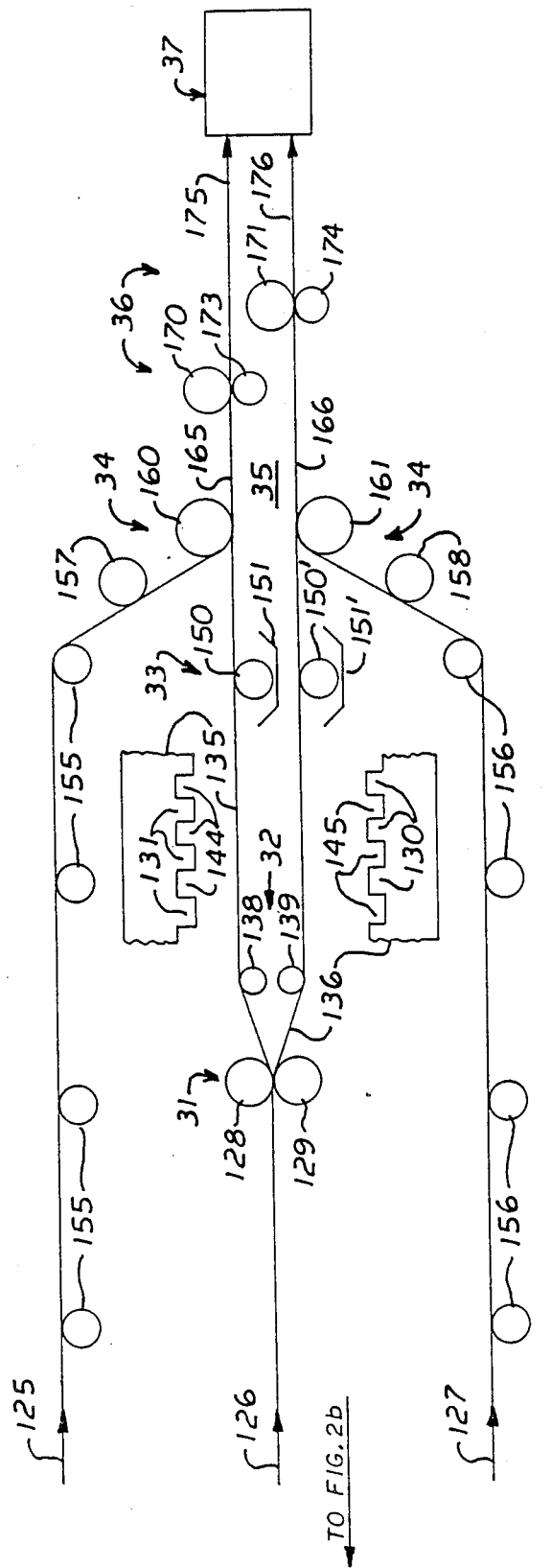

In FIG. 2c to the right of the separator 32, there is shown a top view of the separated strips illustrating the tabs 130 and 131 and the intermediate cut-outs 144 and 145 which are better shown in FIG. 5.

Each strip 135 and 136 continues on to an adhesive applicator 33. The upper adhesive applicator 33 comprises an applicator drum 150 and a trough 151 in which applicator drum 150 is partially immersed. Laminated strip 135 rides over the upper surface of drum 150 which applies an adhesive from trough 151 to the underside of tabs 131 of the strip 135. In the same way a lower applicator (represented by numerals 150' and 151') applies adhesive to the underside of tabs 130 of strip 136.

Strips 125 and 127 which were cut from the laminated sheet 110 at slitter 30 are conveyed over conveyors 155 and 156 and shifted at shim shifter 34 so that they become aligned with the outer edges of tabs 131 and 130, respectively. Strips 125 and 127 underlie the tabs 131 and 130 and also the cut-out portions 144 and 145. Shim shifter 34 may comprise offset rolls 157 and 158 which rotate around axes at an angle with respect to conveyors 155 and 156 respectively.

At station 35, the strips 125 and 127 are laminated to tabs 131 and 130 respectively by laminating drums 160 and 161. The drums 160 and 161 provide surfaces against which the strips 125 and 127 are held against tabs 131 and 130 of strips 135 and 136 respectively.

The three-tiered strips 165 and 166 are conveyed to a cutting station 36 which comprises cutting drums 170 and 171 each with its back-up roll 173 and 174 respectively. Cutting drums 170 and 171 have sharp projecting strips spaced around their peripheries at preset intervals to cut strips 165 and 166 into separate roofing shingles.

Roofing shingles 175 and 176 are conveyed to a packaging station 37 which is a conventional shingle packing station.

FIG. 6 illustrates the novel roofing shingle of the invention, by showing it in perspective. The main sheet 135 has a straight single layer upper edge 180 and a triple level lower edge. The lower edge 181 has an upper layer comprising the main sheet 135 with an intermediate layer comprising the laminated sheet 40b and a bottom layer comprising the continuous strip 125. The cut-out portions 144 are shown to be only two layers in depth with the bottom layer 125 covering the cut-out portions. The tabs 131 are three layers thick because of the addition of strip 125 to their underside.

The width of the strip 125 is wider than the length of a tab 131 and equal to the width of intermediate sheet 40b so that strip 125 underlies tabs 131 and also the underside of the central laminate sheet 40b. As an alternative construction, strip 125 may be wider than the second sheet 40b and narrower than the first sheet 135.

Certain changes can be made in the process, if desired. For example, it would be possible to perform the slitting operation which forms sheets 40a and 40b out of sheet 40 at a location other than that shown. Sheet 40 could be left intact until after it has been top coated and the granules applied. Then, after slitting, sheets 40a and 40b could be laminated leaving a layer of granules between the two sheets. This process would produce a thicker butt shingle without adding appreciably to the complexity of the process.

In order to show that much of the general machinery and process is well known to those skilled in the art, it is intended to incorporate in this disclosure the following publication:

"Manufacture, Selection and Application of Asphalt Roofing and Siding Products" by N. L. Strahan and published by Asphalt Roofing Manufacturers Association of 757 Third Avenue, New York, N.Y. 10017, copyrighted, 1966.

In summary there has been disclosed an apparatus, and process for making a novel roofing shingle by cutting a single web into two parts, laminating the two parts with coincident centerlines, and then cutting a pair of strips from along edge portions of the laminated sheet, cutting the laminated sheet into two strips with interdigitating tabs, separating the two strips and laminating the pair of strips to the tabs of the laminated sheets to form a tri-level thick butt shingle from a single sheet of material. The novel apparatus and the novel roofing shingle are described.

While the present invention has been described with respect to specific embodiments thereof, it should be understood that the invention is not limited thereto as many modifications thereof can be made. It is, therefore, contemplated to cover by the present application any and all such modifications as fall within the spirit and scope of the appended claims.

We claim:

1. A roofing shingle comprising a top asphalt coated sheet, a second asphalt coated sheet, adhesive means between said sheets to secure said sheets together to form a two-layered, laminated sheet, said second sheet being substantially narrower than said top sheet and having one edge of said second sheet in alignment with one edge of said top sheet, said laminated sheet having alternating tabs and cut-out portions along one edge thereof, and a strip adhered along the underside of said tabs and coincident with the outer edges of said tabs to form a unitary roofing shingle.

2. A roofing shingle as recited in claim 1 in which the aligned edges of said laminated sheet comprises a series of outwardly extending tabs and in which the opposite edge of said laminated sheet comprises only said top sheet in a straight line.

3. A roofing shingle as recited in claim 1 in which said strip is wider than said second sheet and is narrower than said first sheet, whereby said strip completely covers said second sheet.

* * * * *

REEXAMINATION CERTIFICATE (3001th)
United States Patent [19]
Jennus et al.

[11] B1 4,869,942
[45] Certificate Issued Sep. 24, 1996

[54] TRILAMINATED ROOFING SHINGLE

[75] Inventors: Robert E. Jennus, Brandon, Fla.; Dale P. Major, Camden, Ark.

[73] Assignee: The Celotex Corporation, Tampa, Fla.

Reexamination Requests:
No. 90/003,774, Apr. 3, 1995
No. 90/003,780, Apr. 6, 1995

Reexamination Certificate for:
Patent No.: 4,869,942
Issued: Sep. 26, 1989
Appl. No.: 135,967
Filed: Dec. 21, 1987

Related U.S. Application Data

[62] Division of Ser. No. 895,988, Aug. 14, 1986, Pat. No. 4,729,814.

[51] Int. Cl.$^6$ ........................................ E04D 1/26
[52] U.S. Cl. ................ 428/77; 428/143; 428/192; 52/557; 52/559
[58] Field of Search ............... 428/77, 143, 192; 52/557, 559

[56] References Cited

U.S. PATENT DOCUMENTS

| | | | |
|---|---|---|---|
| D. 247,786 | 4/1978 | Flood | D25/80 |
| 1,153,418 | 9/1915 | Bird | 52/314 |
| 1,698,891 | 1/1929 | Overbury | 52/557 |
| 1,829,886 | 11/1931 | Yates et al. | 52/557 |
| 1,897,139 | 2/1933 | Overbury | 52/557 |
| 3,180,783 | 4/1965 | Walker et al. | 52/557 |
| 3,921,358 | 11/1975 | Bettoli | 52/314 |
| 3,998,685 | 12/1976 | Czyzewski et al. | 156/260 |
| 4,198,257 | 4/1980 | Pfaff | 156/260 |
| 4,233,100 | 11/1980 | Cunningham et al. | 156/260 |
| 4,274,243 | 6/1981 | Corbin et al. | 52/748 |
| 4,717,614 | 1/1988 | Bondoc et al. | 52/557 |

FOREIGN PATENT DOCUMENTS 963626   3/1975   Canada.

*Primary Examiner*—Alexander S. Thomas

[57] ABSTRACT

This invention provides a process and apparatus which automatically and in a continuous and uninterrupted manner laminates a narrow strip of bituminous coated glass mat to the bottom side of a coated glass mat, cuts the laminated product to produce a laminate having cut-out areas between remaining tabs and then adheres thin strips of coated glass mat across the tabs to underlie the tabs and the cut-out areas. The final shingle is made from a single glass mat which is processed into a three level shingle, each level being made of a portion of the original glass mat.

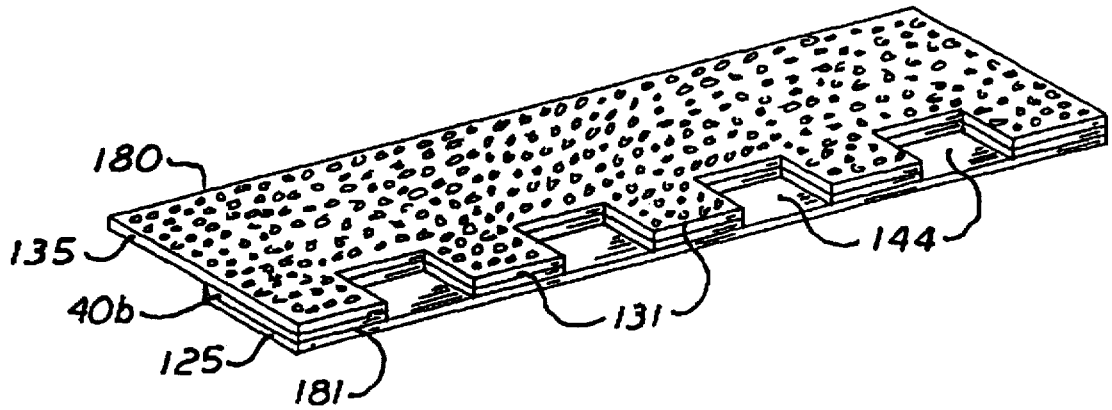

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2 and 3, dependent on an amended claim, are determined to be patentable.

New claims 4–19 are added and determined to be patentable.

1. A roofing shingle comprising a top asphalt coated sheet, a second asphalt coated sheet, adhesive means between said sheets to secure said sheets together to form a two-layered, laminated sheet, said second sheet being substantially narrower than said top sheet and having one edge of said second sheet in alignment with one edge of said top sheet, said laminated sheet having alternating tabs and cut-out portions along one edge thereof, and a strip adhered along the underside of said tabs, [and] coincident with the outer edges of said tabs *and covering the cut-out portions* to form a unitary roofing shingle.

4. *A roofing shingle comprising a top asphalt coated glass fiber mat, a second asphalt coated glass fiber mat, adhesive means between said top mat and said second mat to secure said mats together to form a two-layered, laminated sheet, said second mat being substantially narrower than said top mat and having one edge of said second mat in alignment with one edge of said top mat, said laminated sheet having alternating tabs and cut-out portions along one edge thereof, and a third asphalt coated glass fiber mat adhered along the underside of said tabs, coincident with the outer edges of said tabs and covering the cut-out portions to form a unitary roofing shingle, said third mat having substantially the same width as said second mat.*

5. *A roofing shingle as recited in claim 1, wherein said top sheet comprises a glass fiber mat.*

6. *A roofing shingle as recited in claim 1, wherein said second sheet comprises a glass fiber mat.*

7. *A roofing shingle as recited in claim 1, wherein said strip comprises an asphalt coated glass fiber mat.*

8. *A roofing shingle as recited in claim 1, wherein said top sheet and said second sheet each comprise a glass fiber mat.*

9. *A roofing shingle according to claim 1, wherein there is a layer of granules on top of said top sheet.*

10. *A roofing shingle according to claim 1, wherein there is a layer of granules on top of said second sheet and between said top sheet and said second sheet.*

11. *A roofing shingle according to claim 1, wherein there is an asphalt coating on the underside of said top sheet.*

12. *A roofing shingle according to claim 1, wherein there is an asphalt coating on the underside of said second sheet.*

13. *A roofing shingle according to claim 1, wherein there is an asphalt coating on top of said second sheet and between said top sheet and said second sheet.*

14. *A roofing shingle according to claim 1, wherein said second sheet and said strip are substantially the same width.*

15. *A roofing shingle according to claim 1, wherein said strip is wider than the cut-out portion of the two-layered laminated sheet.*

16. *A roofing shingle according to claim 2, wherein there is an adhesive on the underside of the outwardly extending tabs.*

17. *An improved roofing shingle comprising:*

*a top glass fiber mat, substantially rectangular in shape, the upper surface of said top glass fiber mat being coated with asphalt and having a layer of granules thereon, said top glass fiber mat having alternating tabs and cut-out portions along one of its long edges;*

*an intermediate glass fiber mat with at least one asphalt-coated surface and an upper surface adhered to the bottom surface of said top glass fiber mat, said intermediate glass fiber mat being substantially rectangular in shape, the width of said intermediate glass fiber mat being substantially less than the width of said top glass fiber mat and wider than the cut-out portions in said top glass fiber mat, said intermediate glass fiber mat having along one of its long edges alternating tabs and cut-out portions, the tabs and cut-out portions on said intermediate glass fiber mat being aligned with the tabs and cut-out portions on said top glass fiber mat;*

*a bottom glass fiber mat with at least one asphalt-coated surface and an upper surface adhered to the bottom surface of said intermediate glass fiber mat, said bottom glass fiber mat being narrower in width than said top glass fiber mat and at least as wide as the cut-out portions of said top glass fiber mat, said bottom glass fiber mat being coincident with the outer edges of the tabs of the top and intermediate glass fiber mats and covering the cut-out portions of the top and intermediate glass fiber mats;*

*said top, intermediate and bottom glass fiber mats thereby defining a substantially rectangular roofing shingle with a long edge three layers in depth, with tabs and cut-out portions two layers in depth and wherein the bottom glass fiber mat underlies the cut-out portions.*

18. *A improved roofing shingle according to claim 17, wherein there is a layer of granules on the bottom glass fiber mat.*

19. *An improved roofing shingle according to claim 17, wherein the intermediate glass fiber mat and the bottom glass fiber mat each have a layer of granules thereon.*

* * * * *